United States Patent
Zheng et al.

(10) Patent No.: US 10,565,377 B1
(45) Date of Patent: Feb. 18, 2020

(54) CONTEXT-BASED ANALYSIS OF APPLICATIONS

(71) Applicant: Palo Alto Networks, Inc., Santa Clara, CA (US)

(72) Inventors: Cong Zheng, Fremont, CA (US); Zhi Xu, Fremont, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

(21) Appl. No.: 15/387,593

(22) Filed: Dec. 21, 2016

(51) Int. Cl.
  *G06F 11/00* (2006.01)
  *G06F 21/56* (2013.01)
  *H04L 29/06* (2006.01)

(52) U.S. Cl.
  CPC ........ *G06F 21/563* (2013.01); *H04L 63/0254* (2013.01); *H04L 63/168* (2013.01)

(58) Field of Classification Search
  CPC ............. H04L 63/1416; H04L 63/1408; H04L 63/1441; H04L 63/168; H04L 63/0254; G06F 21/563
  USPC .......................................................... 726/23
  See application file for complete search history.

(56) References Cited

U.S. PATENT DOCUMENTS

| | | | | |
|---|---|---|---|---|
| 8,719,936 B2* | 5/2014 | Moffie | ................ | G06F 21/552 726/23 |
| 8,949,797 B2* | 2/2015 | Aaraj | .................... | G06F 21/554 717/127 |
| 9,003,528 B2* | 4/2015 | Stolfo | ................... | G06F 21/552 726/22 |
| 9,531,736 B1* | 12/2016 | Torres | ................ | H04L 63/1408 |
| 2009/0328215 A1* | 12/2009 | Arzi | ....................... | G06F 21/316 726/23 |
| 2011/0258610 A1* | 10/2011 | Aaraj | .................... | G06F 21/554 717/128 |
| 2016/0057159 A1* | 2/2016 | Yin | ....................... | H04L 63/145 726/23 |
| 2016/0203318 A1* | 7/2016 | Avasarala | .............. | G06F 21/56 726/23 |

OTHER PUBLICATIONS

Artz et al., FlowDroid: Precise Context, Flow, Field, Object-sensitive and Lifecycle-aware Taint Analysis for Android Apps, PLDI' 14, Jun. 9-11, 2014.
Feng et al., Apposcopy: Semantics-Based Detection of Android Malware through Static Analysis, FSE'14, Nov. 16-22, 2014.
Lu et al., CHEX: Statically Vetting Android Apps for Component Hijacking Vulnerabilities, CCS' 12, Oct. 16-18, 2012.
Yang et al., DroidMiner: Automated Mining and Characterization of Fine-grained Malicious Behaviors in Android Applications, 2014.
Balzarotti et al., "Saner: Composing Static and Dynamic Analysis to Validate Sanitization in Web Applications," 2008 IEEE Symposium on Security and Privacy (sp 2008), Oakland, CA, pp. 387-401, 2008.

(Continued)

*Primary Examiner* — Samson B Lemma
(74) *Attorney, Agent, or Firm* — Van Pelt, Yi & James LLP

(57) ABSTRACT

Evaluating samples is disclosed. A sample is received. A determination is made that the sample includes at least one sensitive code segment. A set of paths that include execution of the code segment is determined based at least in part using static analysis. A verdict for the sample is determined based at least in part on the set of paths.

21 Claims, 6 Drawing Sheets

(56) References Cited

OTHER PUBLICATIONS

Christodorescu et al., "Mining specifications of malicious behavior". In Proceedings of the the 6th joint meeting of the European software engineering conference and the ACM SIGSOFT symposium on the foundations of software engineering (ESEC-FSE '07). ACM, New York, NY, USA, 5-14. 2007.

Fu et al., "A Static Analysis Framework for Detecting SQL Injection Vulnerabilities," 31st Annual International Computer Software and Applications Conference (COMPSAC 2007), Beijing, pp. 87-96, 2007.

Kolbitsch et al., "Razzle: De-cloaking Internet Malware," 2012 IEEE Symposium on Security and Privacy, San Francisco, CA, pp. 443-457, 2012.

Lam et al., "Securing web applications with static and dynamic information flow tracking". In Proceedings of the 2008 ACM SIGPLAN symposium on Partial evaluation and semantics-based program manipulation (PEPM '08). ACM, New York, NY, USA, 3-12. 2008.

Livshits et al., "Finding Security Vulnerabilities in Java Applications with Static Analysis". In USENIX Security Symposium (vol. 14, pp. 18-18). Aug. 2005.

Moser et al., "Exploring Multiple Execution Paths for Malware Analysis," 2007 IEEE Symposium on Security and Privacy (SP '07), Berkeley, CA, pp. 231-245, 2007.

Zheng et al., "Path sensitive static analysis of web applications for remote code execution vulnerability detection". In Proceedings of the 2013 International Conference on Software Engineering (ICSE '13). IEEE Press, Piscataway, NJ, USA, 652-661. 2013.

\* cited by examiner

US 10,565,377 B1

CONTEXT-BASED ANALYSIS OF APPLICATIONS

BACKGROUND OF THE INVENTION

Individuals are increasingly spending more time using mobile devices and less time using traditional computers. This shift in usage is present both in personal and in business contexts. For example, employees of companies are increasingly using mobile devices for their work related activities. In conjunction with this shift in user behavior, nefarious individuals and organizations are increasingly targeting mobile devices with malicious applications ("malware"). Unfortunately, it can be difficult to protect mobile devices using existing techniques.

BRIEF DESCRIPTION OF THE DRAWINGS

Various embodiments of the invention are disclosed in the following detailed description and the accompanying drawings.

DETAILED DESCRIPTION

Figure 1:
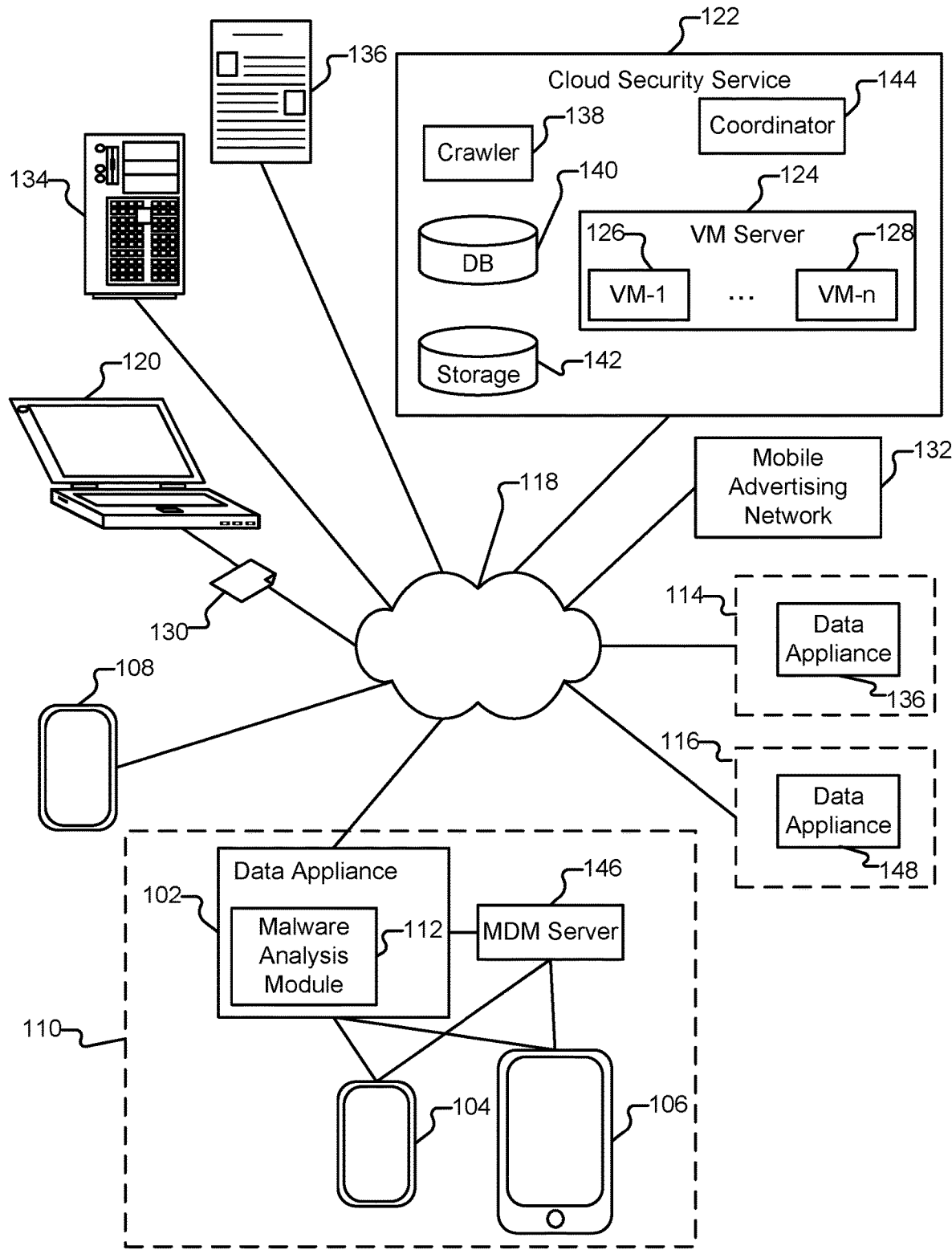
FIG. 1 illustrates an example of an environment in which malware is detected and prevented from causing harm.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein).

Security devices (e.g., security appliances, security gateways, security services, and/or other security devices) can include various security functions (e.g., firewall, anti-malware, intrusion prevention/detection, and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls. Also, special purpose hardware for next generation firewalls implemented, for example, as dedicated appliances generally provides higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

FIG. 1 illustrates an example of an environment in which malicious applications ("malware") are detected and prevented from causing harm. Applications of other types (e.g., adware) can also be analyzed using embodiments of the environment shown in FIG. 1. As will be described in more detail below, components of applications (e.g., resource files/libraries used in conjunction with authoring the applications) can be evaluated using techniques described herein, and applications can be classified based on their components and/or actions attributable to those included components. The term "application" is used throughout the Specification to collectively refer to programs, bundles of programs, manifests, packages, etc., irrespective of form/platform. An "application" can be a standalone file (e.g., a calculator app having the filename calculator.apk) and can also be an independent component of another application (e.g., a mobile advertisement SDK embedded within the calculator app). "Malware" as used herein refers to an "application" that engages in behaviors, whether clandestinely or not, of which a user does not approve/would not approve if fully informed (whether illegal or not). Examples of malware include Trojans, viruses, rootkits, spyware, adware, hacking tools, keyloggers, personal information collectors, etc. And, as will be described in more detail below, while the examples described herein generally involve mobile applications (e.g., those executed on a mobile phone), the techniques described herein can also be used in conjunction with other platforms (e.g., desktop applications).

One particular example of mobile malware is a malicious Android Application Package .apk (APK) file that appears to an end user to be a free game, but stealthily sends SMS premium messages (e.g., costing $10 each), running up the end user's phone bill. Another example of mobile malware is a flashlight application that stealthily collects the user's contacts and sends them to a spammer. Yet another example of mobile malware is an application that collects and reports to a remote server the end user's location (but does not offer location-based services to the user, such as a mapping service). Other forms of mobile malware can also be detected/thwarted using the techniques described herein. And, the techniques described herein can be used to classify a variety of types of mobile applications (in addition to or instead of classifying malware).

Suppose a nefarious individual wishes to propagate mobile malware (such as malware 130) via system 120 to end users. A variety of approaches can be used by the nefarious individual. As one example, the individual can upload mobile malware 130 to a software distribution platform such as platform 134 (also referred to as an "an app store"). The nefarious individual hopes that unsuspecting users of platform 134 (e.g., any of applicable client devices 104-108) will download the malicious application 130 from platform 134 and install it on their devices. Example embodiments of platform 134 include Google Play, iOS App Store, BlackBerry World, Windows Phone Store, Windows Store, and Amazon Appstore. Additional examples of software distribution platforms include third party software distribution platforms, such as GetJar and Cydia.

Another way the nefarious individual can attempt to propagate mobile malware is by posting it on a message/forum site, such as site 136. In this scenario, the nefarious individual again hopes that unsuspecting users of site 136 will download and install the malicious application 130. Yet another way for the nefarious individual to attempt to propagate mobile malware 130 is to attach it to an email message and hope that the recipient (e.g., the owner of device 104) will open the attachment and install the program. Yet another way for the nefarious individual to attempt to propagate mobile malware 130 is to include it in an advertising company's ad network (e.g., mobile ad network 132) and hope that the user will install the promoted program. Yet another way for the nefarious individual to attempt to propagate mobile malware 130 is to include a download link for the malware within phishing SMS messages and hope the recipient (e.g., the owner of device 104) will download the malware and install the program. Yet another way for the nefarious individual to attempt to propagate mobile malware 130 is to use another piece of malware that is already installed on device 104 and let the already installed malware install the new malware 130 on device 104.

In the example shown in FIG. 1, client devices 104-106 are a smartphone and a tablet (respectively) present in an enterprise network 110. Client device 108 is outside enterprise network 110. As shown, client device 104 runs an Android-based operating system and is owned by an individual hereinafter referred to as "Alice." Client device 106 runs a version of iOS. Client device 108 is a smartphone that runs Windows Mobile OS. Each of the devices shown can be protected using techniques described herein. Other devices running other operating systems (whether mobile devices or other devices, such as laptop computers, desktop computers, gaming platforms, etc.) can also be protected using the techniques described herein.

Data appliance 102 is configured to enforce policies regarding communications between clients such as clients 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website downloads, files exchanged through instant messaging programs, and/or other file transfers. In some embodiments, appliance 102 is also configured to enforce policies with respect to traffic that stays within enterprise network 110. In some embodiments, other devices are included in network 110, such as a mobile device management (MDM) server 146, which is in communication with data appliance 102. As shown, MDM server 146 communicates with mobile devices (e.g., 104, 106) to determine device status and to report (e.g., periodically) such mobile device status information to data appliance 102. MDM server 146 can be configured to report the presence of malicious applications installed on devices such as device 104/106, and/or can be configured to receive indications of which mobile applications are malicious (e.g., from appliance 102, from service 122, or combinations thereof). In some embodiments, data appliance 102 is configured to enforce polices against devices 104 and 106 based on information received from MDM server 146. For example, if device 106 is determined to have malware installed on it (or other unapproved types of applications), data appliance 102 (working in cooperation with MDM server 146) can deny device 106 access to certain enterprise resources (e.g., an Intranet) while allowing device 104 (which does not have malware installed upon it) access to the resources.

Figure 2:
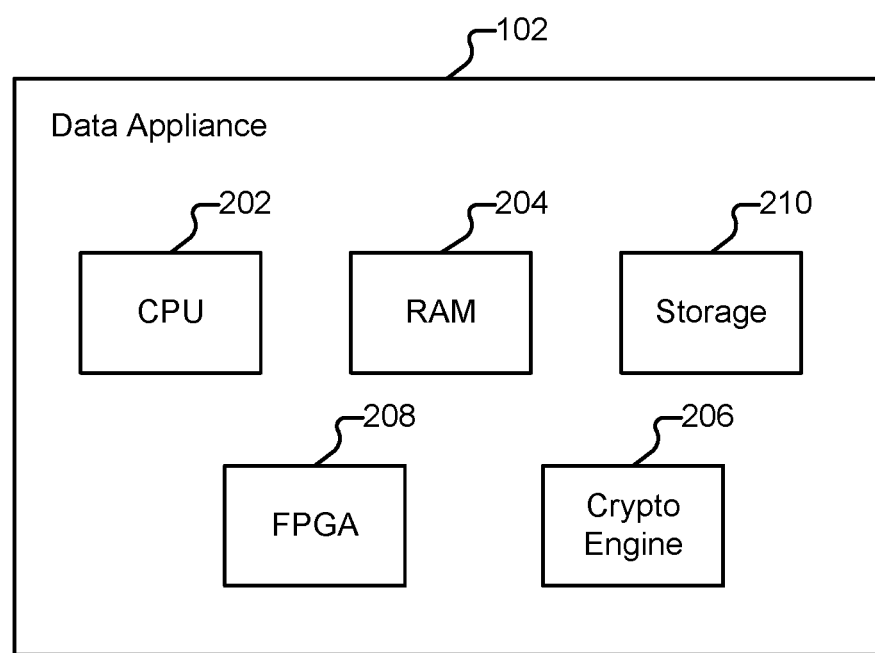
FIG. 2 illustrates an embodiment of a data appliance.

An embodiment of a data appliance is shown in FIG. 2. The example shown is a representation of physical components that are included in appliance 102, in some embodiments. Specifically, appliance 102 includes a high performance multi-core CPU 202 and RAM 204. Appliance 102 also includes a storage 210 (such as one or more hard disks), which is used to store policy and other configuration information, as well as URL information. Data appliance 102 can also include one or more optional hardware accelerators. For example, data appliance 102 can include a cryptographic engine 206 configured to perform encryption and decryption operations, and one or more FPGAs 208 configured to perform matching, act as network processors, and/or perform other tasks.

Appliance 102 can take a variety of forms. For example, appliance 102 can be a single, dedicated device (e.g., as shown), and can also be a set of devices. The functionality provided by appliance 102 can also be integrated into or executed as software on a general purpose computer, a computer server, a gateway, and/or a network/routing device. For example, in some embodiments, services provided by data appliance 102 are instead (or in addition) provided to client 104 (or client 106) by an agent or other software executing at least partially on client 104 (or client 106).

Whenever appliance 102 is described as performing a task, a single component, a subset of components, or all components of appliance 102 may cooperate to perform the task. Similarly, whenever a component of appliance 102 is described as performing a task, a subcomponent may perform the task and/or the component may perform the task in conjunction with other components. In various embodiments, portions of appliance 102 are provided by one or more third parties. Depending on factors such as the amount of computing resources available to appliance 102, various logical components and/or features of appliance 102 may be omitted and the techniques described herein adapted accordingly. Similarly, additional logical components/features can be added to appliance 102 as applicable.

Suppose data appliance 102 intercepts an email sent by laptop 120 to device 104 to which a copy of app 130 has been attached. As an alternate, but similar scenario, data appliance 102 could intercept an attempted download by device 104 of app 130 from platform 134 or site 136. Data appliance 102 determines whether a signature for the attachment (i.e., app 130) is present on data appliance 102. A signature, if present, can indicate that the attachment is known to be safe, and can also indicate that the attachment is known to be malicious. If no signature for the attachment is found, in some embodiments, data appliance 102 is configured to provide the attachment (app 130) to a mobile malware analysis module 112 for real-time analysis. As will be described in more detail below, a combination of static and dynamic analysis can be performed on the application to determine whether it is malicious, and/or to otherwise classify it. As will further be described in more detail below, the static and dynamic analysis can be performed taking into account the various types of components used to author the application, as well as its execution context. And, an application initially determined to be not-malicious can be re-classified as additional information about the application becomes known.

As mentioned above, analysis of app 130 can be performed on premise (e.g., at the enterprise). For example, the analysis can be performed by a malware analysis module 112 included in data appliance 102. Instead of or in addition to on-premise analysis, appliance 102 can also send a copy of app 130 to cloud security service 122 for analysis. Further, cloud security service 122 can also (or instead) obtain copies of mobile applications for evaluation from sources other than data appliance 102. As one example, cloud security service 122 can include a crawler 138 configured to periodically crawl platform 134 and/or site 136 (or other sources of apps), looking for new or updated applications. Such applications can then be analyzed by cloud security service 122. In some embodiments, platform 134 and/or site 136 make copies of applications available to cloud security service 122 via an Application Programming Interface (API) made available by service 122, instead of or in addition to crawler 138 obtaining such copies. Further, in various embodiments, cloud security service 122 and/or malware analysis module 112 are incorporated into platform 134 and/or site 136.

Copies of received applications (i.e., awaiting analysis) are stored in storage 142 and analysis is commenced (or scheduled, as applicable). As will be described in more detail below, results of the analysis (and additional information pertaining to the applications) are stored in database 140, as is, in some embodiments, information pertaining to components incorporated into various applications.

Cloud security service 122 can comprise one or more dedicated commercially available hardware servers (e.g., having multi-core processor(s), 8G+ of RAM, gigabit network interface adaptor(s), and hard drive(s)) running typical server-class operating systems (e.g., Linux). In various embodiments, service 122 is implemented across a scalable infrastructure comprising multiple such servers, solid state drives, and/or other applicable high-performance hardware. Cloud security service 122 can comprise several distributed components, including components provided by one or more third parties. For example, portions or all of cloud security service 122 can be implemented using the Amazon Elastic Compute Cloud (EC2) and/or Amazon Simple Storage Service (S3). Further, as with data appliance 102, when cloud security service 122 is referred to as performing a task, such as storing data or processing data, it is to be understood that a sub-component or multiple sub-components of cloud security service 122 (whether individually or in cooperation with third party components) may cooperate to perform that task. As one example, cloud security service 122 can optionally perform its analysis in cooperation with one or more virtual machine (VM) servers, such as VM server 124.

An example of a virtual machine server is a physical machine comprising commercially available server-class hardware (e.g., a multi-core processor, 4+Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers cloud security service 122, but may also be provided by a third party. As one example, the virtual machine server can rely on EC2, with the remainder portions of cloud security service 122 provided by dedicated hardware owned by and under the control of the operator of cloud security service 122. As will be explained in more detail below, virtual machine server 124 is configured to provide one or more virtual machines 126-128 for emulating mobile (or other) devices. The virtual machines can execute a variety of operating systems and/or versions thereof. Observed behaviors resulting from executing applications in the virtual machines are logged and analyzed (e.g., for indications that the application is malicious). In some embodiments the log analysis is performed by the VM server (e.g., VM server 124). In other embodiments, the analysis is performed at least in part by other components of service 122, such as coordinator 144.

In some embodiments, cloud security service 122 makes available the results of its analysis of mobile applications via a list of signatures (and/or other identifiers) to appliance 102 (and/or to MDM server 146) as part of a subscription. For example, service 122 can send a content package that identifies malware apps periodically (e.g., daily, hourly, or some other interval, and/or based on an event based on a policy). An example content package includes a listing of identified malware apps (e.g., information in the content package can include an app package name, an app hash code for uniquely identifying the app, and a malware name for each identified malware app). The subscription can cover the analysis of just those files intercepted by data appliance 102 and sent to cloud security service 122 by data appliance 102, and can also cover signatures of all malware known to cloud security service 122 (or subsets thereof, such as just mobile malware but not other forms of malware (e.g., PDF malware)). Further, in some embodiments, cloud security service 122 is configured to provide security services to entities in addition to or instead of an operator of data appliance 102. For example, other enterprises, having their own respective enterprise networks 114 and 116, and their own respective data appliances 136 and 148 can contract with the operator of service 122. Other types of entities can also make use of the services of cloud security service 122. For example, a carrier providing cellular service to device 108 can contract with cloud security service 122 to analyze applications which device 108 attempts to download. As another example, the owner of device 108 can contract with cloud security service 122 to analyze applications. As yet another example, an operator of app store 134, and/or an operator of site 136 can contract with cloud security service 122 to analyze mobile applications (e.g., for a fee).

In the event app 130 is determined to be malicious (whether by cloud security service 122 or by data appliance 102), appliance 102 can be configured to automatically block the file download based on the analysis result. Further, a signature can be generated for app 130 and distributed (e.g., to other data appliances such as appliances 136 and 148) to automatically block future file transfer requests to download the file determined to be malicious.

In the following section, approaches to performing sample analysis (e.g., static and dynamic analysis) of mobile applications will be described. Information obtained through sample analysis can be combined with information obtained through traffic analysis associated with the application (e.g., as observed by data appliances 102, 136, and/or 148). Further, using techniques described herein, applications such as app 130 which may initially be determined (e.g., by appliance 102) to be not-malicious can have their verdicts revised as additional information associated with the app is obtained.

Analyzing Mobile Applications

Overview

Figure 3:
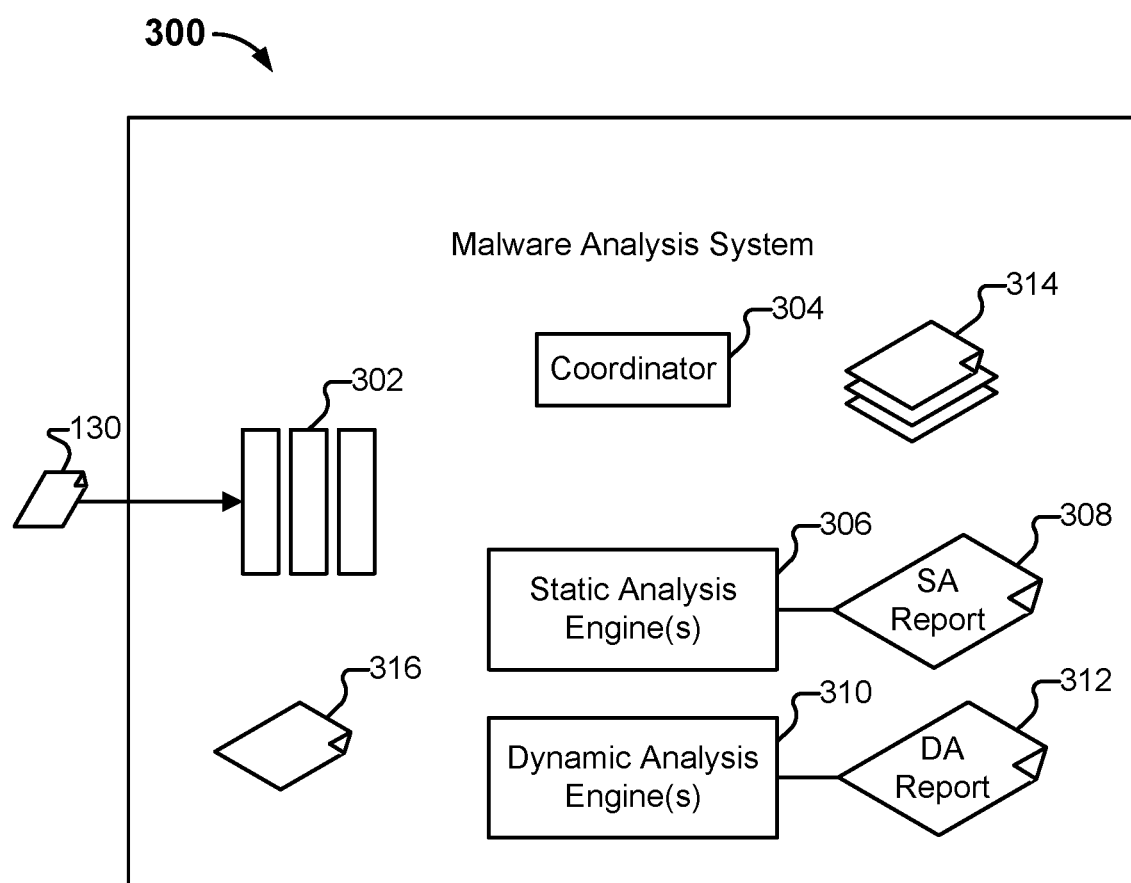
FIG. 3 illustrates an example of logical components included in a system for performing static and dynamic analysis on an application.

FIG. 3 illustrates an example of logical components included in a system for performing static and dynamic sample analysis on an application. As explained above, system 300 can be implemented using a single device. For example, the functionality of system 300 can be implemented on data appliance 102 which includes an analysis module 112. System 300 can also be implemented, collectively, across multiple distinct devices. For example, the functionality of system 300 can be provided by cloud security service 122.

As will be described in more detail below, system 300 is configured to perform a two part analysis on mobile device applications, including by performing static and dynamic analysis. The two-phase approach helps improve the accuracy of mobile malware detection, while lowering the false positive rate of mislabeling benign application files as malware (e.g., due to harmless but poor programming techniques on the part of the application's author; due to including a common third party library, such as a legitimate advertising library, that requires permissions not otherwise used by the application; and/or due to legitimate uses of sensitive API calls).

During the static analysis portion of the analysis, the application (also referred to herein as a "host application" or "host APK") is reversed into a "reversed host application" (also referred to herein as a "reversed host APK"). The reversed host application is (in some embodiments) a directory structure (e.g., including one or more subdirectories) of source (and/or intermediate) code and resource files reversed from a given host application. In various embodiments, during static analysis, the structure of the APK file is examined (e.g., by reading the META-INF/CERT. SF) and parsing the DEX file format for classes.dex is performed. As will be described in more detail below, static analysis can be used to identify the presence of "sensitive code segments" in the APK. A sensitive code segment is one or more API calls (or other code elements) that involve a potentially sensitive/exploitable permission/resource. The following are examples of sensitive code segments:

Example 1: in Android, Send SMS: "invoke-virtual/range {v0 . . . v5}, Landroid/telephony/SmsManager;->sendTextMessage(Ljava/lang/String;Ljava/lang/String;Ljava/lang/String;Landroid/app/Pending Intent;Landroid/app/PendingIntent;)V"

Example 2: in Android, Capture Video: "invoke-virtual {v0, v1}, Landroid/media/MediaRecorder;->setPreviewDisplay(Landroid/view/Surface;)V sget-object v0, Lcom/google/android/service/update/takeVideoActivity;->c:Landroid/media/MediaRecorder; invoke-virtual {v0}, Landroid/media/MediaRecorder;->prepare( )V sget-object v0, Lcom/google/android/service/update/takeVideoActivity;->c:Landroid/media/MediaRecorder; invoke-virtual {v0}, Landroid/media/MediaRecorder;->start( )V"

Example 3: in Android, Read Contacts: "invoke-virtual {v0}, Landroid/content/Context;->getContentResolver ( )Landroid/content/ContentResolver; sget-object v1, Landroid/provider/ContactsContract$Contacts;->CONTENT_URI:Landroid/net/Uri; invoke-virtual/range {v0 . . . v5}, Landroid/content/ContentResolver;->query(Landroid/net/Uri; [Ljava/lang/String;Ljava/lang/String; [Ljava/lang/String;Ljava/lang/String;)Landroid/database/Cursor;

Example 4: in Android, Get Location: "const-string v2, "network" invoke-virtual {v0, v2}, Landroid/location/LocationManager;->getLastKnownLocation(Ljava/lang/String;) Landroid/location/Location; move-result-object v0 new-instance v1, Ljava/lang/StringBuilder; invoke-virtual {v0}, Landroid/location/Location;->getLatitude( )D move-result-wide v2 invoke-virtual {v0}, Landroid/location/Location;->getLongitude( )D move-result-wide v2"

Example 5: in Android, Get Phone Number: "invoke-virtual {v0}, Landroid/telephony/TelephonyManager;->getLine1Number( )Ljava/lang/String;"

Example 6: in iOS, Install a package:
r4=[[SYSDKController alloc] init];
r3=[self storeDirectory:arg2];
[NSString stringWithFormat:@"\"%@\"", r3];
[r4 e:[NSString stringWithFormat:@"dpkg %@"]];
_objc_msgSend$shim(r4, @selector(release));

Other examples of sensitive code segments include (e.g., for Windows applications) checking the system registry, and (e.g., for Linux applications) attempting to modify init.rc.

The presence of a sensitive code segment in an APK indicates that the APK can potentially take a sensitive action/perform a sensitive function. For example, if an APK includes the code provided above as "Example 1," the APK can potentially send SMS messages when executed on a device. A sensitive code segment can be present in an APK for a variety of reasons. As a first reason, the sensitive code segment may be included as a legitimate (and desired) behavior of a benign application. For example, a video editing application may legitimately require the ability to record video, and would accordingly include code such as is shown in Example 2 above. A malicious application can also include a sensitive code segment. For example, a malicious flashlight application might be authored to include the sensitive code segment shown in Example 4 above—allowing the flashlight application to determine an unsuspecting device owner's location.

The mere presence of one or more sensitive code segments in an application is generally not dispositive of whether or not an application is malicious. As mentioned above, there are often legitimate (and desirable) reasons for such code segments to be included in an application. For example, a contact manager application will legitimately require access to a user's contacts in order to function. As another example, suppose an application author includes in an application a library (or toolkit, or other code) that makes available a variety of functions (included sensitive ones). The application itself may not make use of (all, or any) of the sensitive code segments included in the library. Flagging all applications which include sensitive code segments as malicious will generally result in a large number of false positives. Accordingly, and as will be described in more detail below, analysis system 300 can evaluate the context in which a sensitive code segment is included in an application and use the contextual information to help determine whether the application is malicious or not. Further, information collected by analysis system 300 can be exported as "evidence" to support verdicts about applications. For example, rather than merely labeling a particular application as "benign" or "malicious," evidence for reaching that verdict can be provided, such as, "malicious: application exports contacts without user interaction."

As will be described in more detail below, during static analysis, a call graph can be constructed and examined with respect to sensitive code segments. In particular, a determination can be made as to how sensitive code segments can be called (if at all) by an executing application, and heuristics can be employed to help determine whether an application is malicious or not. As one example, suppose an application includes a sensitive code segment, but according to the call graph the sensitive code segment is never called. As explained above, one reason for this is that the sensitive codes segment is included in an SDK that is incorporated into the application, but the sensitive code segment itself is not used by the application. Such a non-executable sensitive code segment can be considered dead code, and the presence of the sensitive code in the application can be treated as benign accordingly. As another example, where the call graph for an application does indicate that sensitive code segments are called, the call path(s) to the sensitive code segment can be examined. If the sensitive code segment is only called in response to a user interaction, an assumption can be made that the user was aware of (and/or consented to) the sensitive behavior. If the sensitive code segment is instead called on startup (or otherwise executed without user input), an assumption can be made that the sensitive behavior is being hidden from the user (e.g., nefariously). A verdict (e.g., benign or malicious) can be assigned to each path to the sensitive code segment in the application during static analysis (e.g., based on how the code segment is called).

During the dynamic portion of the analysis, behaviors performed by the application are analyzed (e.g., to check whether the application in fact uses its capabilities suspiciously/maliciously when executing). As will be described in more detail below, heuristics can be used in conjunction with dynamic analysis to determine whether a particular behavior, (e.g., when executed by a particular library) should be considered malicious. The paths (and corresponding verdicts) can be used to customize dynamic analysis. For example, if static analysis reveals that user interactions are required to trigger a sensitive code segment, such interactions can be simulated during dynamic analysis.

A final verdict pertinent to the application can be made based on both the application's content (e.g., where the application includes a URL verified to be a malicious website) and on the context in which it behaves (e.g., whether the usage of a suspicious capability is made aware to an end user or is performed silently in the background). The application can also be classified without a maliciousness verdict being made. For example, an embodiment of system 300 can be configured to classify applications as using a particular SDK, containing a particular sensitive code segment, etc., without regard to whether or not the applications are in fact malicious.

In various embodiments, system 300 makes use of lists, databases, or other collections of known safe content and/or known bad content (collectively shown in FIG. 3 as collection 314). Collection 314 can be obtained in a variety of ways, including via a subscription service (e.g., provided by a third party) and/or as a result of other processing (e.g., performed by data appliance 102 and/or service 122). Examples of information included in collection 314 are: URLs of known malicious websites; URLs of known safe websites; signatures, hashes, and/or other identifiers of known malicious applications; signatures, hashes, and/or other identifiers of known safe applications; signatures, hashes, and/or other identifiers of known malicious files (e.g., Android exploit files); signatures, hashes, and/or other identifiers of known safe libraries; and signatures, hashes, and/or other identifiers of known malicious libraries. In various embodiments, collection 314 includes a list (or other appropriate data structure) of sensitive code segments.

Ingestion

In various embodiments, when a new mobile application is received for analysis (e.g., an existing signature associated with the mobile application is not present in system 300), it is added to processing queue 302. In the following example, suppose the application is called "game.apk," (app 130) but that it is not yet known whether or not the app is malicious. The Android application package "game.apk" is an example of a "host APK."

As explained above, a mobile application for analysis can be received in a variety of ways. As one example, a mobile application can be received by data appliance 102 for analysis when data appliance 102 intercepts an email or other data transmission intended for device 104 that includes the application. Additional examples of the receipt of a mobile application include: (1) receipt by service 122 of the application from data appliance 102, platform 134, or site 136 for analysis (e.g., via an API), and (2) crawling by service 122 of systems such as platform 134 or site 136.

Static Analysis

Coordinator 304 monitors the queue, and as resources (e.g., a static analysis worker) become available, coordinator 304 fetches an application from queue 302 for processing (e.g., fetches game.apk). In particular, coordinator 304 first provides the application to static analysis engine 306 for static analysis. In some embodiments, one or more static analysis engines are included within system 300, where system 300 is a single device. In other embodiments, static analysis is performed by a separate static analysis server that includes a plurality of workers (i.e., a plurality of instances of static analysis engine 306).

The static analysis engine obtains general information about the application, and includes it (along with heuristic and other information described below) in a static analysis report 308. The report can be created by the static analysis engine, or by coordinator 304 (or by another appropriate component) which can be configured to receive the information from static analysis engine 306. In some embodiments, the collected information is stored in a database record for the application (e.g., in database 140), instead of or in addition to a separate report 308 being created (i.e., portions of the database record form the report 308). Examples of collected information include: the package name, shared UID, APK file signer information, permissions claimed, and sensitive API calls included in the source (e.g., sending or erasing SMS messages, accessing the phonebook, and tracking user location changes). The static analysis engine also collects and stores information pertaining to the running context of the application, such as: the minimum version of the Android OS required to run the application (the minimum SDK version), and the sensors it will have access to. As will be described in more detail below, the static analysis engine can evaluate the components of the application and include that information in the report as well.

One example of how static analysis can be used to examine sensitive code segments, using game.apk as an example, is as follows and is described in conjunction with process 400 shown in FIG. 4. Similar approaches can be used for applications on other platforms (e.g., iOS applications or Windows applications). In various embodiments, process 400 is performed by malware analysis system 300. Various example functional components which can be used in conjunction with embodiments of process 400 are shown in FIG. 5. Functional components depicted in FIG. 5 can be implemented in a variety of ways, including by using an appropriate scripting language (e.g., Java or python), an open source tool (e.g., T. J. Watson Libraries for Analysis (WALA)), or combinations thereof.

At 402, static analysis engine 306 unzips (502) game.apk and uses a reverser tool 508 (or set of tools), such as dex2jar or Android Apktool, to reverse the resulting .dex file (504) from Dalvik bytecode into Java bytecode (510).

At 404, static analysis engine 306 extracts all function invocation instructions and builds (512) a function call graph. One tool for building such a call graph from Java bytecode 510 is WALA. Other tools can also be used, as applicable. Static analysis engine 306 can then analyze the function call graph (e.g., using a list of known sensitive code segments 514) to locate all functions in the function call graph that contain at least one sensitive code segment. At 406, static analysis engine 306 backward traverses the function call graph (built at 404) to obtain function call paths for any sensitive code segments (516).

In some cases, a sensitive code segment may be directly invoked by a system component, such as an Activity, Service, or Receiver. A sensitive code segment can also be invoked as an indirect call from a non-system component, such as via a Thread, AsyncTask, Handler, etc. At 408, static analysis engine 306 builds (522) a System Component Dependency Graph (SCDG) 518. The node of an SCDG is one of a system component, an indirect call component, and a system event. The attributes of nodes include the entry point function of the component. The edge of an SCDG is either a system component transition instruction or an indirect call instruction.

An SCDG can be used to help understand how a sensitive code segment is being invoked and can be used to help determine whether a sensitive code segment is malicious or benign (e.g., in accordance with heuristic rules). In various embodiments, building an SCDG includes three parts: (1) analyzing the dependency relation between a system event and a system component; (2) analyzing the dependency relation between system components; and (3) analyzing the dependency relation between a system component and an indirect call component.

System Event—System Component Dependency Relations:

The AndroidManifest.xml file (506) statically registers components and defines which system events can drive the component. Such information, obtained from AndroidManifest.xml file (e.g., by component analyzer 520), can thus be used as the dependency relation. Doing so helps to cut off dummy components in the SCDG, as Android components (with the exception of Receiver) that are not registered in the AndroidManifest.xml file will never be executed. Any such unregistered components are dead code. Receiver is an exception in that it can be dynamically registered in the code during its execution. To handle this exception, the "RegisterReceiver( )" instruction can be analyzed (e.g., by data flow analyzer 524) to obtain registration information about the Receiver, such as the name of the registered Receiver and the system event received by the Receiver.

System Component Dependency Relations:

To analyze the dependency relation between system componenets, static analysis engine 306 locates all system component transition instructions, and then analyzes which system components are combined by the instruction. As one example, the Activity—Activity transition instructions are: "startActivity( )" and "startActivityForResult( )" and the Activity—Service transition instruction are "startService( )" and "bindService( )" After all component transition instructions are collected, static analysis engine 306 analyzes the Intent parameters (since the Intent is used to start components in Android system). Data flow analysis (524) can be used to analyze the Intent information and determine which target component is represented by Intent.

System Component—Indirect Call Component Relations:

To analyze the dependency relation between a system component and an indirect call component, static analysis engine 306 finds all indirect call instructions, and then determines which caller and callee are combined by the instruction. As one example, the "Thread1.start( )" instruction in the function "Activity1.onCreate( )V" combines the system component "Activity1" and the indirect call component "Thread1." The entry point of "Thread1" is its "run ( )V" function.

Figure 4:
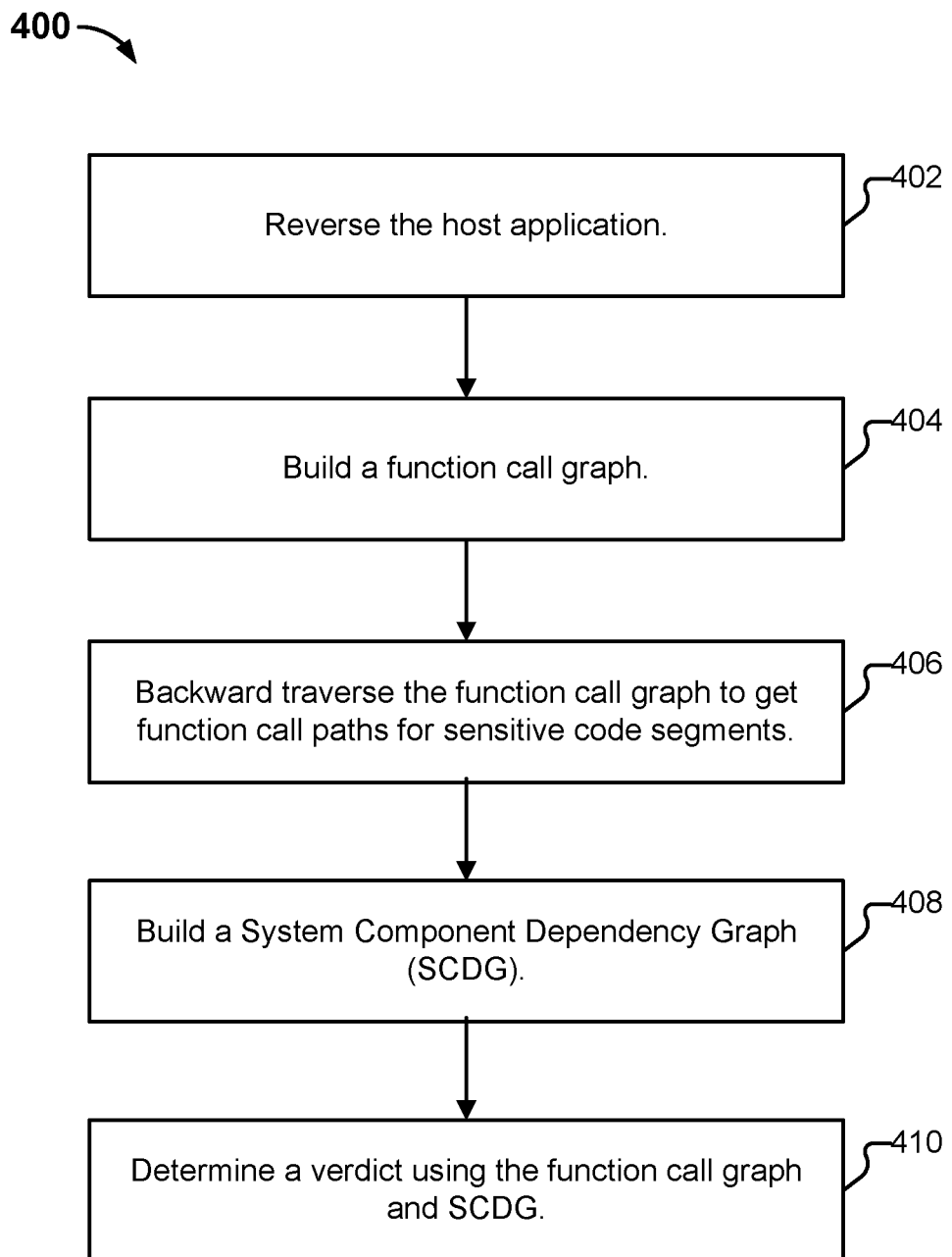
FIG. 4 illustrates an embodiment of a process for performing static analysis on an application.
Figure 5:
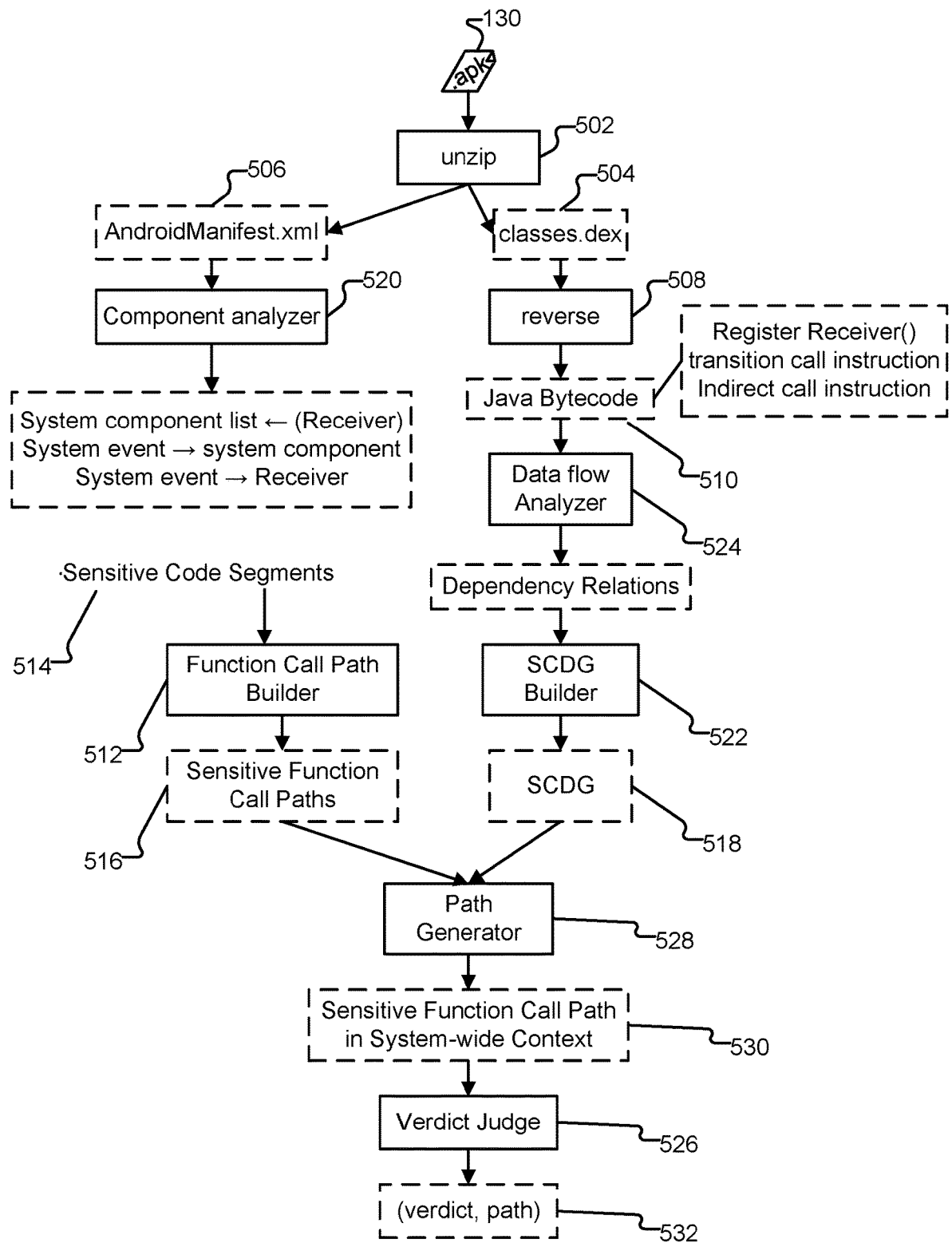
FIG. 5 illustrates functional components used in performing static analysis on an application.

Returning to process 400 shown in FIG. 4, at 410 a verdict for the app (e.g. app 130) can be determined (e.g., by verdict judge 526) using the function call paths (516) and SCDG (518). In particular, the static analysis engine (e.g., a script 528) can use the entry point of a function call path (determined at 406) and find its corresponding node in the SCDG to determine a call path for the sensitive code segment in a system-wide context (530). Heuristic rules can then be used to determine whether the sensitive code segment is being used in a malicious manner by the application or not. Examples are as follows. If a path from a system component or an indirect call component contains a sensitive code segment, but a UI function, like the "onClick( )" UI function is also present in the path (prior to the sensitive code segment), the application's use of the sensitive code segment is marked benign. If there is a path from a system event node to a system component containing a sensitive code segment, or if there is a path from an indirect call component node to the sensitive code segment, and no UI functions exist in the path, this sensitive behavior should be regarded as being triggered automatically without user awareness. The triggering of sensitive code segments without user awareness can be considered malicious or suspicious by system 300 as applicable. The path/verdict pair (532) can be included in the report, as can the function call graph (512), and/or the SCDG (518), as applicable. The function call graph and/or the SCDG can also be stored separately, as applicable. As will be described in more detail below, the path and verdict (532) can be provided as input to a dynamic analysis engine.

Other kinds of static analysis can also be performed by static analysis engine 306 and results included in the static analysis report 308 as applicable. For example, in addition to the function call graph/SCDG-related heuristic rules, static analysis engine 306 can use other heuristic rules on other features hit by the source code. For example, if the APK has duplicate entry names (e.g., containing two classes.dex files in the same folder within the APK) in the file, it is malicious. (E.g., because it is attempting to exploit the Android security vulnerability #8219321.) Examples of such other features include the following (where an example of "the host APK" is "game.apk"):

1. "Contains APK file": If the received APK contains other APK files within the package, the host APK is suspicious.

2. "Contains Known Malicious APK File": If there exist other APK files within the package, those included APK files are analyzed separately (e.g., are added to the queue or checked with existing known malicious applications). If any of the included APK files are determined to be malicious, the received APK is considered malicious as well.

3. "Hide Menu Icons": The menu icons are graphical elements placed in the options menu. If the received APK does not have the menu icons or attempts to hide the menu icons, it is suspicious.

4. "File Type Mismatch": If the received APK contains files whose formats do not match their extensions, it is highly suspicious (of maliciousness). For example, several Android malware families (e.g., Android.Droiddream family) attempt to hide additional included APK files as database files by naming them with the ".db" extension rather than ".apk." As another example, a file labeled as a ".png" may instead be an ".xml" file used for a command and control channel. However, a legitimate developer may also inadvertently misname a file (or otherwise misname a file without malicious intent).

5. "Contains Executable Files": If the received APK contains executables for the Linux platform (e.g., the .elf files), it is suspicious.

6. "Contains Malicious Executable Files": If the included executable files are known malicious files, e.g., known exploit libraries, the received APK is malicious.

7. "Installs Other APKs": If the received APK has the capacity of installing other APK files (e.g., while running in the background), it is suspicious.

8. "Uninstalls Other APKs": If the received APK has the capacity of uninstalling other APK files (e.g., while running in the background), it is suspicious.

9. "Contains Dangerous Shell Commands": If the received APK contains dangerous shell commands, e.g., chmod and su, it is malicious.

10. "Requires Abnormal Permissions": If the received APK requires permissions such as "system debug," or "authenticate accounts," and/or factory adjustments such as setting process limits, it is suspicious.

11. "Contains Phone number": If the received APK contains phone number(s), it is suspicious (e.g., because the application may place calls or text messages to premium numbers).

12. "Contains URLs": If the received APK contains URL(s) within the source code, it is suspicious.

13. "Contains Malicious URL": Any URL(s) found are compared against a list of known malicious sites. If the URL(s) link to malicious site(s), the received APK is malicious.

14. "Contain Autorun.inf file": If the received APK contains an autorun.inf file that is for the Windows platform, it is malicious (e.g., because an attempt will be made by the user's computer to execute the file if the user connects the phone to the computer).

15. "Duplicate Entries": If the APK has duplicate entry names (e.g., containing two classes.dex files in the same folder within the APK) in the file, it is malicious. (E.g., because it is attempting to exploit the Android security vulnerability #8219321.)

Returning to FIG. 3, the static analysis engine stores the results of the rule testing in a database (e.g., in database 140) in the record associated with the application being tested (and/or includes the results in report 308 as applicable). In some embodiments, the static analysis engine also forms a verdict with respect to the application (e.g., "safe," "suspicious," or "malicious"). As one example, the verdict can be "malicious" if even one "malicious" static feature is present in the application. As another example, if the only "suspicious" code is attributable to a common library included in the application, and no "malicious" code is found, the verdict can be "safe." As yet another example, points can be assigned to each of the features (e.g., based on severity if found; based on how reliable the feature is for predicting malice; etc.) and a verdict can be assigned by static analysis engine 306 (or the coordinator, if applicable) based on the number of points associated with the static analysis results. As yet another example, the verdict can be "original" or "repackaged" (e.g., where static analysis engine 306 is configured to analyze applications for repackaging, only, without additional regard for maliciousness).

In some cases, an application may appear "suspicious" to static analysis engine 306 due to poor programming choices made by a harmless programmer, rather than a malicious one. As one example, the programmer may have named an executable that handles playing of an MP3 file with a ".mp3" extension. This sort of filetype mismatch (i.e., that an executable is incorrectly labeled with a non-executable extension) could indicate malicious behavior (i.e., a malicious individual is trying to hide a malicious executable through misnaming the filename). Here, however, the file was inadvertently mislabeled. Static analysis engine 306 notes (e.g., with rule "File Type Mismatch" being included in the static analysis report) that there is a "suspicious" aspect to the file which warrants additional investigation during dynamic analysis to reach a conclusion as to whether the application is benign or malicious.

In some embodiments, static analysis engine 306 will conclude that the application will crash (and/or cause the virtual machine to crash) if executed. As one example, static analysis engine 306 can perform integrity checking and determine that a file is missing, corrupted, unsigned, etc. In this scenario, dynamic analysis can be skipped (e.g., with static analysis noting in report 308 that the application will crash if an attempt is made to install/execute it).

Dynamic Analysis

Once the static analysis is complete, coordinator 304 locates an available dynamic analysis engine 310 to perform dynamic analysis on the application. As with static analysis engine 306, system 300 can include one or more dynamic analysis engines directly. In other embodiments, dynamic analysis is performed by a separate dynamic analysis server that includes a plurality of workers (i.e., a plurality of instances of dynamic analysis engine 310).

Each dynamic analysis worker manages a mobile device emulator (e.g., running in a virtual machine). Results of the static analysis (e.g., performed by static analysis engine 306), whether in report form (308) and/or as stored in database 140, or otherwise stored are provided as input to dynamic analysis engine 310. The static report information is used to help customize the type of dynamic analysis performed by dynamic analysis engine 310, conserving resources and/or shortening the time required to evaluate an application. As one example, if static analysis has concluded that the application does not have the ability to access SMS messages, during dynamic analysis, the receipt of SMS messages will not be simulated in some embodiments. As another example, if static analysis has concluded that the only access the application has to a sensitive permission (e.g., the ability to read SMS messages) is via a common library, certain triggering actions (e.g., the receipt of SMS messages) can similarly not be simulated. As another example, if static analysis has concluded that the application has the ability to access GPS information, during dynamic analysis, various changes in location of the device can be simulated. However, if the application lacks the ability to access GPS information, in some embodiments no location changes will be simulated (reducing the amount of time/computing resources needed to complete dynamic analysis). Similarly, even where the application has the ability to access GPS information, if that information is only accessed via a common library, in some embodiments no location changes will be simulated.

Dynamic analysis engine 310 can determine which emulator(s) to run based on the minimum operating system version number required by the application (and determined during static analysis). If the minimum version number is Android 4.0, dynamic analysis engine 310 will launch an Android emulator having that version number (and, in some embodiments, will not attempt to emulate a lower version of Android). If the minimum version number is Android 2.3, multiple emulators can be used to evaluate the application (e.g., Android 2.3, and any higher versioned emulators, such as Android 4.0). Where multiple emulators are used, a single dynamic analysis engine can manage all of the emulators (whether in sequence or in parallel), or multiple dynamic analysis engines can be used (e.g., with each managing its own emulator), as applicable.

Figure 6:
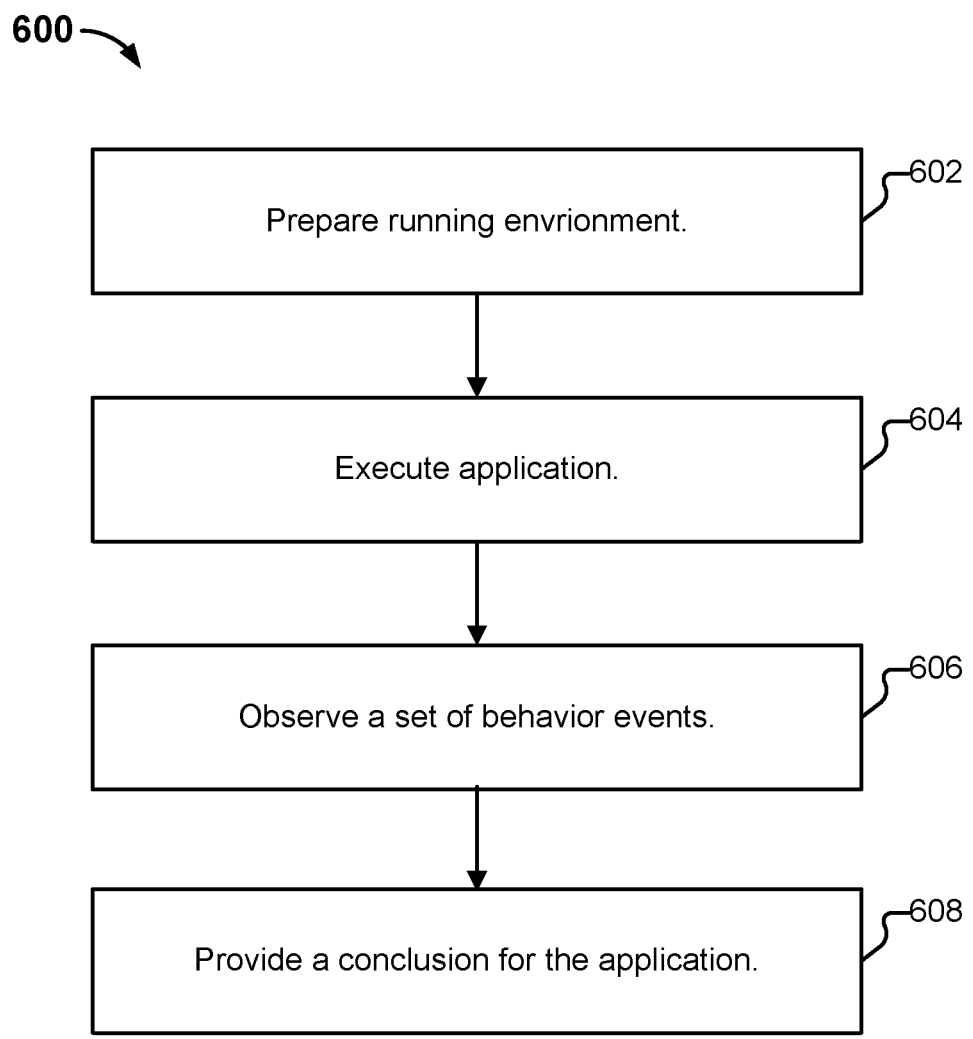
FIG. 6 illustrates an embodiment of a process for performing dynamic analysis on a mobile device application.

One example of how dynamic analysis can be performed on an application is as follows, and described in conjunction with the process shown in FIG. 6. The dynamic analysis engine/worker begins analysis by preparing and setting up the running environment for the application to be tested (602). As explained in more detail below, the environment is instrumented/hooked such that behaviors observed while the application is executing are logged and which libraries/classes are responsible for which behaviors is tracked. Examples of operations carried out by the dynamic analysis engine/worker at 602 include: (1) determining which system services should be started (e.g., simulated motion sensor readings and simulated location changes); and (2) determining what set of simulated user operations should take place (e.g., performed after installation, in sequence). As previously mentioned, results of static analysis can be used to inform what dynamic analysis is performed. For example, if static analysis determines that a user interaction is included in an execution path to a sensitive code segment, dynamic analysis engine can be set up to simulate such user interaction. In particular, verdict/path pairs (532) determined by static analysis engine 306 can be used to determine which system events and/or UI events should be simulated during dynamic analysis.

The dynamic analysis engine/worker loads an appropriate emulator (e.g., Android version 2.3) and installs the application to be analyzed. As mentioned above, the emulators used by sample analysis system 300 are instrumented. For example, they are configured to log activities as they occur in the emulator (e.g., using a customized kernel that supports hooking and logcat). Further, network traffic associated with the emulator is captured (e.g., using pcap). The generated log file (or a separate file associated with the log file, as applicable) indicates which class or other subcomponent within the application was responsible for the application engaging in a particular behavior. For example, when the application attempts to send an SMS, or access a device identifier, the path to the sensitive code segment corresponding to that behavior can be used in analysis.

In some embodiments, dynamic analysis is performed in two stages. In particular, after the application has been installed and executed (with associated simulated information/events) and a first log file is created (e.g., "logcat1.txt"), a reboot of the emulator is performed and the application is launched and interacted with again, resulting in a second log file (e.g., "logcat2.txt"). Dynamic analysis engine 310 evaluates both log files, along with any network traffic captured during the two stages (e.g., using pcap).

Returning to process 600, the application is executed (604) and various applicable actions (e.g., selected based on static analysis report 308) are performed (e.g., by the dynamic analyzer executing commands via an Android Debug Bridge ("adb") connection and/or through the use of a service coordinator included in the modified emulator and configured to orchestrate the simulation of user events such as button presses as commanded by the dynamic analysis engine). As one example, if the application was determined during static analysis to have access to location information, changes in location will be simulated in the emulator. Any resulting behaviors performed by the application are logged (606). In some embodiments, the log data is stored as a temporary file on system 300.

As with the static analysis engine, the dynamic analysis engine stores the results of its analysis in the database in the record associated with the application being tested (and/or includes the results in report 312 as applicable). As will be described in more detail below, a variety of conclusions (also referred to herein sometimes as final verdicts) can be made with respect to analyzed applications (e.g., at 608). In some embodiments, a final verdict associated with the application is made (e.g., based on a combination of report 308 and report 312) by coordinator 304. A variety of approaches can be used to determine a final verdict for an application. As one example, the verdict can be "malicious" if even one "malicious" feature is present in the application. As another example, points can be assigned to each of the features (e.g., based on severity if found; based on how reliable the feature is for predicting malice; etc.) and a verdict can be assigned by dynamic analysis engine 310 (or the coordinator, if applicable) based on the number of points associated with the static analysis results.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising: a processor configured to:
receive a sample;
determine, based at least in part by performing static analysis on the sample, a set of function call paths that include execution of a sensitive code segment comprising the sample;
build a system component dependency graph; and
assign a maliciousness verdict to the sample at least in part by using the system component dependency graph to evaluate the set of function call paths, including by determining whether, for each function call path included in the set of function call paths, the sensitive code segment is called in response to a human interaction;
wherein, for at least one function call path included in the set of function call paths, the sensitive code segment is not called in response to a human interaction; and
a memory coupled to the processor and configured to provide the processor with instructions.

2. The system of claim 1 wherein the maliciousness verdict assigned to the sample is "benign" when the set of function call paths is empty.

3. The system of claim 1 wherein the maliciousness verdict for the sample is that the sample is benign.

4. The system of claim 1 wherein the maliciousness verdict for the sample is that the sample is malicious.

5. The system of claim 1 wherein the maliciousness verdict for the sample is that the sample is suspicious.

6. The system of claim 1 wherein the processor is further configured to assign the maliciousness verdict at least in part by determining a dependency relation between a system event and a system component.

7. The system of claim 1 wherein the processor is further configured to assign the maliciousness verdict at least in part by determining a dependency relation between a set of system components.

8. The system of claim 1 wherein the processor is further configured to assign the maliciousness verdict at least in part by determining a dependency relation between a system component and an indirect call.

9. The system of claim 1 wherein the processor is further configured to perform dynamic analysis on the sample.

10. The system of claim 9 wherein the dynamic analysis to be performed is selected at least in part based on the set of function call paths.

11. A computer implemented method by at least one hardware processor, the method comprising: receiving a sample;
determining by the at least one hardware processor, based at least in part by performing static analysis on the sample, a set of function call paths that include execution of a sensitive code segment; building a system component dependency graph; and
assigning a maliciousness verdict to the sample at least in part by using the system component dependency graph to evaluate the set of function call paths, including by determining whether, for each function call path included in the set of function call paths, the sensitive code segment is called in response to a human interaction; wherein, for at least one function call path included in the set of function call paths, the sensitive code segment is not called in response to a human interaction.

12. The method of claim 11 wherein the maliciousness verdict assigned to the sample is "benign" when the set of function call paths is empty.

13. The method of claim 11 wherein the maliciousness verdict for the sample is that the sample is benign.

14. The method of claim 11 wherein the maliciousness verdict for the sample is that the sample is malicious.

15. The method of claim 11 wherein the maliciousness verdict for the sample is that the sample is suspicious.

16. The method of claim 11 further comprising assigning the maliciousness verdict at least in part by determining a dependency relation between a system event and a system component.

17. The method of claim 11 further comprising assigning the maliciousness verdict at least in part by determining a dependency relation between a set of system components.

18. The method of claim 11 further comprising assigning the maliciousness verdict at least in part by determining a dependency relation between a system component and an indirect call.

19. The method of claim 11 further comprising performing dynamic analysis on the sample.

20. The method of claim 19 wherein the dynamic analysis to be performed is selected at least in part based on the set of function call paths.

21. A computer program product embodied in a non-transitory computer readable storage medium and comprising computer instructions for:

receiving a sample;

determining, based at least in part by performing static analysis on the sample, a set of function call paths that include execution of a sensitive code segment; building a system component dependency graph; and assigning a maliciousness verdict to the sample at least in part by using the system component dependency graph to evaluate the set of function call paths, including by determining whether, for each function call path included in the set of function call paths, the sensitive code segment is called in response to a human interaction; wherein, for at least one function call path included in the set of function call paths, the sensitive code segment is not called in response to a human interaction.

* * * * *

UNITED STATES PATENT AND TRADEMARK OFFICE
CERTIFICATE OF CORRECTION

| | | |
|---|---|---|
| PATENT NO. | : 10,565,377 B1 | Page 1 of 1 |
| APPLICATION NO. | : 15/387593 | |
| DATED | : February 18, 2020 | |
| INVENTOR(S) | : Cong Zheng and Zhi Xu | |

It is certified that error appears in the above-identified patent and that said Letters Patent is hereby corrected as shown below:

On the Title Page

In page 2, Column 1, item (56), other publications, cite no. 3, delete "Kolbitsch et al., "Razzle: De-cloaking Internet Malware," 2012 IEEE Symposium on Security and Privacy, San Francisco, CA, pp. 443-457, 2012." and insert --Kolbitsch et al., "Rozzle: De-cloaking Internet Malware," 2012 IEEE Symposium on Security and Privacy, San Francisco, CA, pp. 443-457, 2012.--, therefor.

In the Claims

In Column 17, Claim 1, Line(s) 58 & 59, delete "comprising the sample".

Signed and Sealed this
First Day of December, 2020

Andrei Iancu
*Director of the United States Patent and Trademark Office*